UNITED STATES PATENT OFFICE.

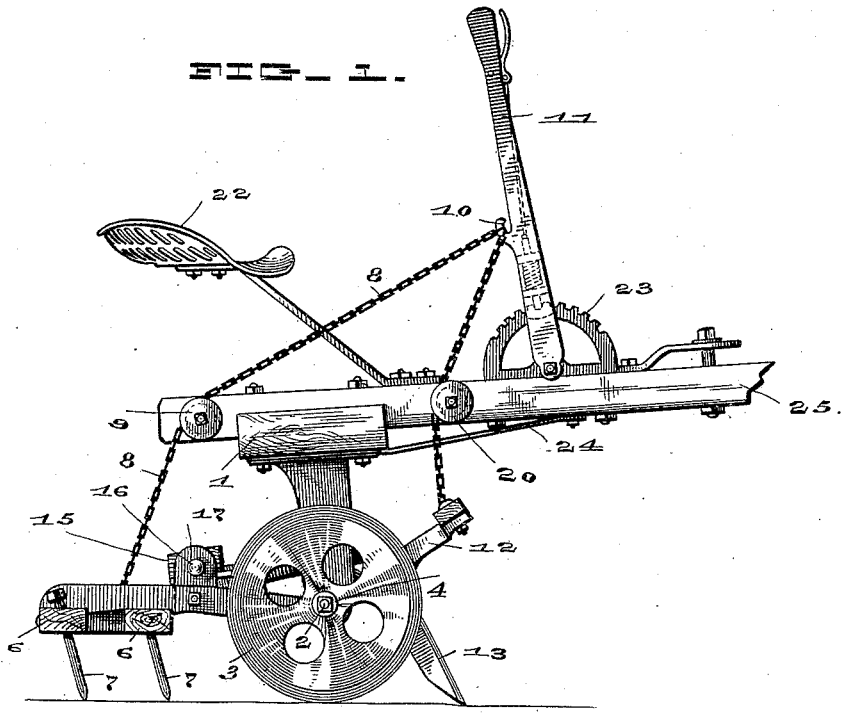
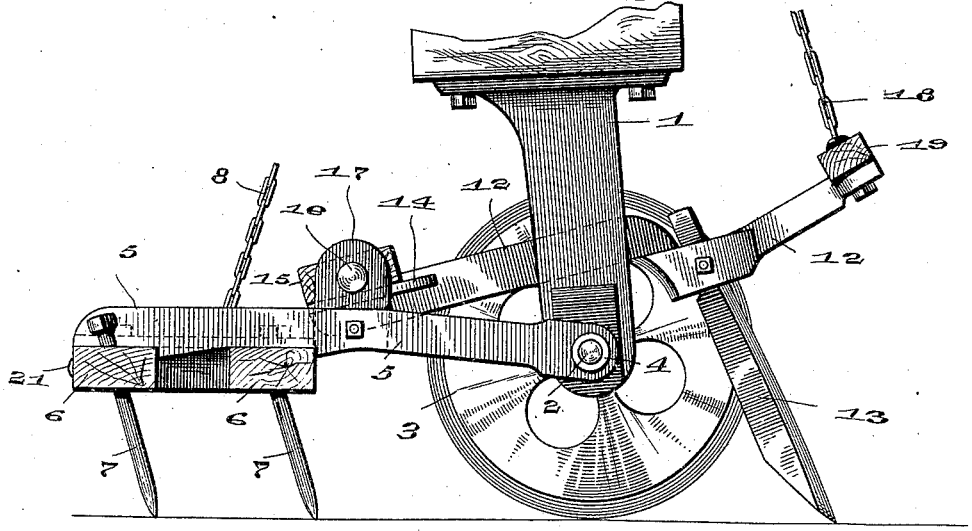

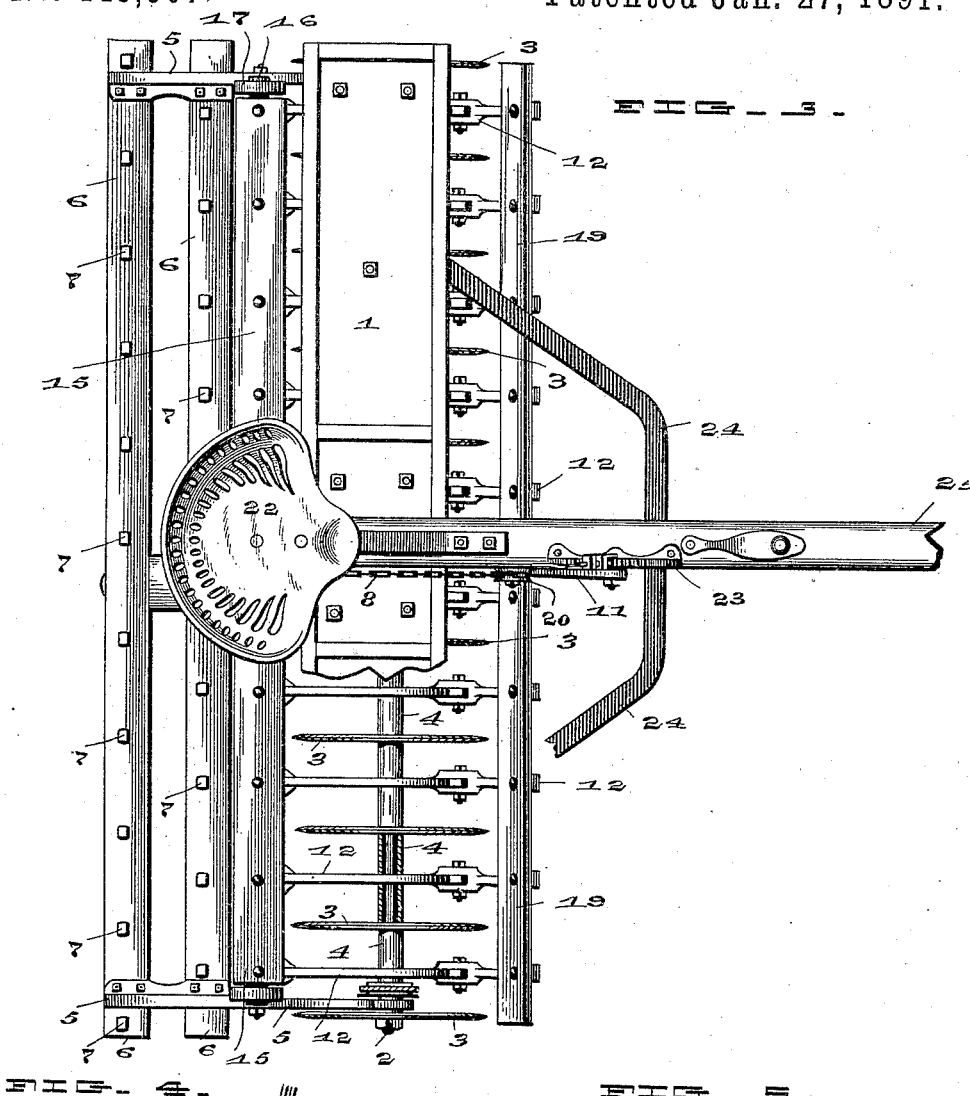

JOSEPH B. OKEY, OF INDIANAPOLIS, INDIANA.

COMBINED HARROW AND SOD-CUTTER.

SPECIFICATION forming part of Letters Patent No. 445,507, dated January 27, 1891.

Application filed October 11, 1890. Serial No. 367,864. (No model.)

*To all whom it may concern:*

Be it known that I, JOSEPH B. OKEY, of Indianapolis, county of Marion, and State of Indiana, have invented certain new and useful Improvements in Combined Harrows and Sod-Cutters; and I do hereby declare that the following is a full, clear, and exact description thereof, reference being had to the accompanying drawings, in which like letters refer to like parts.

My invention relates to the construction of devices for cutting sod and harrowing the ground, and will be understood from the following description.

In the drawings, Figure 1 is a side elevation. Fig. 2 is an enlarged detail side elevation, the top broken off and the end disk removed. Fig. 3 is a top plan view of Fig. 1. Fig. 4 is an enlarged detail view of the manner of connecting the lifting-chain to the harrow-frame. Fig. 5 is an enlarged detail view of the lug and flanged end of the arm that carries the cutting-blades.

In detail, the machine comprises a frame-work 1, to which a tongue 25 is centrally bolted, carrying sheave-wheels upon its side.

2 is an axle carrying cutting-disks 3, with openings in the body of the disks to permit the passage of the earth and prevent its being packed about the axle, these disks being supported by spacing collars or thimbles 4.

5 is an arm, its inner end mounted upon the main axle outside the disks and bolted midway to a lug 17, which is shouldered below in the manner shown in Fig. 5, this arm having a flange at its rear end with bolt-holes, through which pass bolts uniting it to the harrow-frame 6. This frame is composed of two parallel bars connected by a short central cross-brace, and teeth 7 are passed through them in the manner shown in the drawings. They are preferably set at an angle, so as to furnish a greater resistance against the draft. To this harrow-frame a chain 8 is connected in the manner shown in Fig. 4, a bolt 21 extending transversely through the frame-bars and through its lower link, the chain extending from this bolt upward, passing over a sheave-wheel 9, connected with the side of the tongue, and attached to a hook 10 upon the lever 11, as shown in Fig. 1.

22 is the driver's seat, which is supported above the frame-work in the ordinary manner.

12 is an arm, its rear end provided with a flange 14, through which bolts are passed, securing it to a cross-bar 15, which is pivoted at 16 in a lug 17, which is secured by a bolt to the arm 5. This arm 12 extends forward at an incline, then drops downward and is mortised through an enlargement to provide sufficient strength, in which mortise is secured the cutter-blade 13, which is intended to cut the sod traveling in front of the harrow-disks. The forward end of the arm 12, which extends at an angle upward from the mortise, is bolted to a cross-bar 19, which extends across the front end of the machine, and a chain 18 is connected to this cross-bar in a similar manner to that shown in Fig. 4, passing upward over the sheave-wheel 20, bolted at the side of the tongue, and is connected at 10 to a projection of the lever 11. By reference to Fig. 3 it will be seen that the cross-bar 19 carries a series of these arms 12, with their cutter-blades, and that these arms, being connected to the rear cross-bar 15, constitute a swinging frame pivoted at the rear in the lug 17, and that this frame with its cutters may be raised and lowered by the pressure against the lever 11, this lever having the usual spring-latch adapted to engage with the notches of a quadrant-bar 23 connected to the side of the tongue.

It will be observed that the chain which lifts the cutter-frame and that which lifts the harrow-frame are both connected to the lever at one and the same point, so that the same movement raises both, the one being in front and the other behind the series of cutting-disks, which constitute the central part of the machine.

24 is a brace connected to the machine-frame on each side of the tongue, and also centrally to the latter.

I thus combine in one mechanism a framework carrying a series of cutters which cleave the sod and at the same time cut any clods that may be in the way in advance of the harrow-disks, the latter being disposed centrally, and behind this a toothed harrow-frame, both these front and rear devices adapted to be raised and lowered by the lever 11 simultaneously.

What I claim as my invention, and desire to secure by Letters Patent, is the following:

1. A tillage-machine comprising a main frame, an axle journaled therein, a series of cutting-disks mounted on such axle, thimbles interposed between such disks for spacing the same, a toothed harrow-frame connected to arms pivoted on the outer ends of such axle and behind the disks, an auxiliary frame-work pivotally connected to the arms of the harrow-frame and extending forward of the disks, carrying cutting-blades, and lever mechanism for raising and lowering the harrow and cutter frames simultaneously, all combined substantially as shown and described.

2. A tillage-machine comprising, in combination, a main frame, an axle journaled therein, a series of cutting-disks mounted on such axle and separated by spacing-thimbles, a toothed harrow-frame pivoted on the outer ends of the axle and carried behind the disks, a frame-work carrying suitable cutter-blades pivoted behind the axle and extending in front of the disks, a tongue centrally connected to the frame with the driver's seat thereon, a lever mechanism disposed within reach of the driver's hand, connected to the machine, with chains or cords extending from such lever to the harrow and cutter frames, whereby both may be raised and lowered simultaneously, substantially as shown and described.

In witness whereof I have hereunto set my hand this 2d day of October, 1890.

JOSEPH B. $\times$ OKEY.

his mark

Witnesses:
H. D. NEALY,
E. B. GRIFFITH.